(12) United States Patent
Yun et al.

(10) Patent No.: US 8,874,945 B2
(45) Date of Patent: Oct. 28, 2014

(54) CONSTRUCTION EQUIPMENT REMOTE CONTROL SYSTEM AND METHOD FOR CONTROLLING DATA TRANSMISSION/RECEPTION WHILE THE CONSTRUCTION EQUIPMENT IS IN ENGINE-OFF STATE

(75) Inventors: Hong Cheol Yun, Incheon (KR); Jung Mug Shin, Bucheon-si (KR); Duc Woo Park, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 54 days.

(21) Appl. No.: 13/142,165

(22) PCT Filed: Dec. 22, 2009

(86) PCT No.: PCT/KR2009/007677
§ 371 (c)(1),
(2), (4) Date: Jun. 24, 2011

(87) PCT Pub. No.: WO2010/074488
PCT Pub. Date: Jul. 1, 2010

(65) Prior Publication Data
US 2011/0320015 A1  Dec. 29, 2011

(30) Foreign Application Priority Data

Dec. 24, 2008  (KR) .................. 10-2008-0132988

(51) Int. Cl.

| | | |
|---|---|---|
| G06F 1/26 | (2006.01) | |
| G06F 1/32 | (2006.01) | |
| G06F 9/44 | (2006.01) | |
| G07C 5/00 | (2006.01) | |
| H04L 12/12 | (2006.01) | |
| H04L 29/08 | (2006.01) | |
| H04Q 9/00 | (2006.01) | |
| G08C 17/00 | (2006.01) | |

(52) U.S. Cl.
CPC ............... *G08C 17/00* (2013.01); *Y02B 60/32* (2013.01); *G07C 5/008* (2013.01); *H04Q 2209/883* (2013.01); *H04Q 2209/40* (2013.01); *H04L 12/12* (2013.01); *H04L 67/125* (2013.01); *H04Q 9/00* (2013.01); *Y02B 60/34* (2013.01)
USPC ................................ 713/320; 701/2; 717/168

(58) Field of Classification Search
CPC ....................................................... G08C 17/00
USPC ................................ 713/320; 701/2; 717/168
See application file for complete search history.

(56) References Cited

U.S. PATENT DOCUMENTS

| 6,222,463 | B1 * | 4/2001 | Rai ................................ 340/928 |
|---|---|---|---|
| 7,814,353 | B2 * | 10/2010 | Naitou et al. ................. 713/320 |
| 2002/0029313 | A1 * | 3/2002 | Funakoshi ..................... 711/102 |
| 2003/0112124 | A1 * | 6/2003 | Gudmundsson ............. 340/7.38 |
| 2006/0140218 | A1 * | 6/2006 | Winterton ..................... 370/476 |
| 2007/0100513 | A1 * | 5/2007 | Asano ............................... 701/2 |

FOREIGN PATENT DOCUMENTS

| EP | 0245606 | 11/1987 |
|---|---|---|
| EP | 0744322 | 11/1996 |
| KR | 10-2004-0000031 | 1/2001 |
| KR | 10-0608224 | 8/2006 |

OTHER PUBLICATIONS

Search Report dated Jun. 23, 2010 from corresponding International Application No. PCT/KR2009/007677, filed Dec. 22, 2009.

* cited by examiner

*Primary Examiner* — Thomas Lee
*Assistant Examiner* — Robert Cassity
(74) *Attorney, Agent, or Firm* — John D. Veldhuis-Kroeze; Westman, Champlin & Koehler, P.A.

(57) ABSTRACT

The present disclosure relates to a system and a method of remote management of a construction equipment for controlling transmission and reception of data of the construction equipment in a a key-off state. To this end, a system of remote management of a construction equipment according to the present disclosure includes a server communicatable with a communication terminal through a communication network; and a construction equipment where the communication terminal, a equipment control unit, and a plurality of electronic control devices are installed, wherein the communication terminal, the equipment control unit, and the electronic control devices are supplied standby power from a battery provided in the construction equipment, when the equipment control unit receives a key-off signal, the equipment control unit transfers a sleep mode switching command to the communication terminal and the electronic control devices of which operation modes are switched to a sleep mode, when the communication terminal wakes up from the sleep mode state at the time of receiving an operation request from the server and thereafter, wakes up the equipment control unit and transfers the requested operation of the server, and the equipment control unit performs the operation singly when performing the operation singly and thereafter, switches over to the sleep mode when completing the operation, and when the operation is associated with at least one of the electronic control devices, the equipment control unit performs the operation by waking up the corresponding electronic control device and switches the waked up electronic control device to the sleep mode when completing the operation.

3 Claims, 4 Drawing Sheets

US 8,874,945 B2

CONSTRUCTION EQUIPMENT REMOTE CONTROL SYSTEM AND METHOD FOR CONTROLLING DATA TRANSMISSION/RECEPTION WHILE THE CONSTRUCTION EQUIPMENT IS IN ENGINE-OFF STATE

This Application is a Section 371 National Stage Application of International Application No. PCT/KR2009/007677, filed Dec. 22, 2009 and published, not in English, as WO2010/074488 on Jul. 1, 2010, which is herein incorporated by reference in its entirety.

FIELD OF THE DISCLOSURE

The present disclosure relates to a system of remote management of a construction equipment, and more particularly, to a system and a method of remote management of a construction equipment for controlling transmission and reception of data of the construction equipment in a a key-off state.

BACKGROUND OF THE DISCLOSURE

In general, a remote management system of a construction equipment is the system in which a communication terminal receives signals of various digital and analog sensors mounted on a hydraulic system including an engine, a pump, a transmission, and a main control valve in a construction such as an excavator, a wheel loader, or the like to transmit data to a PC of a control station through a communication network and operation data of the construction equipment is made into a database to enable a equipment manager or a equipment repairer to easily recognize interested operation information or history management contents of the construction equipment through an Internet network to support maintenance of an optimal operation condition of the equipment. Routinely, the system is also called a tele-management system or tele-monitoring system (TMS).

Herein, the operation information of the construction equipment is the information including various operation state information such as the temperature of cooling water, the temperature of a working fluid, a fuel residual quantity, battery voltage, an engine speed, a traveling speed, a warning, and a normal operation state of a valve that are displayed on a monitor in a driver's seat. In the remote management system of the construction equipment, data is transmitted from the communication terminal mounted for each construction equipment to a web server by using a predetermined communication network.

Besides, even in the case in which a necessary program such as firmware of the construction equipment is required to be updated, the control station may update the program through the communication network.

However, data transmission and reception between the construction equipment and the control station, such as a request for necessary data and program updating can be subjected to communication only when the construction equipment is with a starting key in an on state and cannot perform communication when the construction equipment is with the starting key in an off state. The reason for that is that since electronic control devices of a general equipment use power generated from an engine or are connected with a battery when a vehicle is driven, the power is not applied to the electronic control devices, which do not operate with the starting key in the on state.

As such, in a current equipment system, since the power is not applied to electronic control devices such as a equipment control unit, an instrument panel, an engine controller unit, and the like when the starting key is in the on state, equipment operating information such as channel information for an audio used at the time of starting the equipment, a wind speed and a wind direction of an air-conditioner, and like cannot be stored/modified/extracted and information stored in volatile memories of corresponding devices is deleted at the same time of stopping the supply of the power and thus cannot be used at the time of restarting the equipment.

Further, when the equipment is in the a key-off state, the control station cannot verify the operation information of the equipment.

In order to solve the problem, a method in which the equipment uploads all the operation information to the PC of the control station before the equipment before stopping the start may be used, but a method of transmitting all the operation information to a server creates high cost for the communication expense due to the increase of communication data. As a result, a method capable of accessing data of the equipment which is with the starting key in the off state is required.

In addition, even when the control station intends to upgrade the firmware, the control station cannot upgrade the firmware when the equipment is with the starting key in the off state. Further, while the operator upgrades the firmware of the equipment with the starting key in the on state, when the operator cannot recognize the starting key in the on state and stops the starting, the program cannot be updated normally and thus there is a possibility to generate a problem in driving the equipment.

As a result, a method capable of transmitting predetermined data such as firmware upgrading with the equipment, which is with the starting key in the off state is required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to idnetify key feautres or essential features of the claimed subject matter, nor are they intended to be used as an aid in determining the scope of the claimed subject matter.

Accordingly, the present disclosure provides a system of remote management of a construction equipment for controlling transmission and reception of data to a construction equipment with a starting key in an off state.

Further, the present disclosure provides a system of remote management of a construction equipment that can request and receive operation information of a construction apparatus from controllers of the construction mechanical equipment and other controllers even with the starting key in the off state and improve power consumption efficiency.

In addition, the present disclosure provides a system of remote management of a construction equipment for controlling transmission and reception of data of the construction equipment so as to normally upgrade a firmware continually even in spite of the off state of the starting key while upgrading the firmware with the starting key in the on state.

To this end, according to a first aspect of the present disclosure, a system of remote management of a construction equipment includes a server communicatable with a communication terminal through a communication network; and a construction equipment where the communication terminal, a equipment control unit, and a plurality of electronic control devices are installed, wherein the communication terminal, the equipment control unit, and the electronic control devices are supplied standby power from a battery provided in the construction equipment, when the equipment control unit receives a key-off signal, the equipment control unit transfers a sleep mode switching command to the communication terminal and the electronic control devices of which operation modes are switched to a sleep mode, when the communication terminal wakes up from the sleep mode state at the time of receiving an operation request from the server and thereafter, wakes up the equipment control unit and transfers the requested operation of the server, and the equipment control unit performs the operation singly when performing the operation singly and thereafter, switches over to the sleep mode when completing the operation, and when the operation is associated with at least one of the electronic control devices, the equipment control unit performs the operation by waking up the corresponding electronic control device and switches the waked up electronic control device to the sleep mode when completing the operation.

Further, according to the exemplary embodiment of the present disclosure, when the operation required by the server is a request for transmission of data possessed by the equipment control unit or the electronic control devices, the equipment control unit may wake up the corresponding electronic control device to collect the data and switch the corresponding electronic control device to the sleep mode again when the requested data is data possessed by at least one of the electronic control devices, and output the collected data to the server through the communication terminal and thereafter, also switch over to the sleep mode.

Furthermore, according to the exemplary embodiment of the present disclosure, when the operation requested by the server is program updating of the equipment control unit or the electronic control devices, the communication terminal may wake up the equipment control unit and receive data required for updating from the server, the equipment control unit may verify whether the data transmitted from the server is program updating in the equipment control unit and thereafter, when the data is its own program updating request, update the corresponding program and when the data is not the program updating request in the equipment control unit, verify an electronic control device in which program will be updated and thereafter, give a wake-up command to the verified electronic control device and when the electronic control device wakes up, transfer the program updating request signal, and the verified electronic control device may wake up by the equipment control unit and thereafter, perform the program updating.

In addition, according to the exemplary embodiment of the present disclosure, when the operation requested by the server is the program updating of the equipment control unit or the electronic control devices, the equipment control unit may supply power to the electronic control device in which program updating is in progress until the program updating is completed and switch the corresponding electronic control device to the sleep mode, and switch the rest of the electronic control devices to the sleep mode, when a starting key off signal is applied during updating a predetermined program in a normal operation state.

Moreover, according to the exemplary embodiment of the present disclosure, when the program updating is completed, the updated program may be stored and thereafter, be applied to the equipment from the time of subsequent starting.

According to a second aspect of the present disclosure, a method for controlling transmission and reception of data in a a key-off state of a construction equipment in a system of remote management of the construction equipment including a construction equipment including a communication terminal, a equipment control unit, and a plurality of electronic control devices, and a server transmitting a predetermined data request signal to the communication terminal through a communication network, includes: transferring, by the equipment control unit, a sleep mode switching command to the communication terminal and the electronic control devices and switching operation modes thereof to a sleep mode, when receiving a key-off signal; transferring, by the communication terminal, a wakeup command to the equipment control unit and thereafter, transferring the data request signal when the equipment control unit wakes up, when receiving the data request signal from the server in the sleep mode state; judging, by the equipment control unit, whether or not to store requested data when receiving the data request signal after waking up when receiving the wakeup command in the sleep mode state; transmitting, by the equipment control unit, the corresponding data to the server through the communication terminal, when storing the requested data; and verifying, by the equipment control unit, an electronic control device storing the corresponding data and waking up the corresponding electronic control device and thereafter, transmitting data requested by the verified electronic control device to the server, when not storing the requested data.

According to a third aspect of the present disclosure, a method for controlling transmission and reception of data in a a key-off state of a construction equipment in a system of remote management of the construction equipment including a construction equipment including a communication terminal, a equipment control unit, and a plurality of electronic control devices, and a server transmitting a predetermined data request signal to the communication terminal through a communication network, includes: requesting, by the server, program updating to the communication terminal; transmitting, by the communication terminal, a wakeup command to the equipment control unit and thereafter, transferring the program updating request when the equipment control unit wakes up, when receiving the program updating request in a sleep mode; verifying, by the equipment control unit, whether the program updating request is a program updating request in the equipment control unit when receiving the program updating request after waking up when receiving the wakeup command in the sleep mode; updating the corresponding program when the program updating request is the program updating request in the equipment control unit in accordance with the verification result; verifying an electronic control device of which a program will be updated and thereafter, giving the wakeup command to the verified electronic control device, and transferring the program updating request signal when the electronic control device wakes up, when the program updating request is not the program updating request in the equipment control unit in accordance with the verification result; and updating, by the verified electronic control device, the corresponding program when receiving the program updating request signal after waking up when receiving the wakeup command in the sleep mode.

Further, according to the exemplary embodiment of the present disclosure, the method may further include continuously updating, by the equipment control unit, the program by using standby power when receiving a starting key off signal during updating a predetermined program in a normal operation state and switching over to the sleep mode when the updating is completed.

In addition, according to the exemplary embodiment of the present disclosure, the method may further include continuously updating, by the electronic control device, the program by using standby power when receiving the starting key off signal during updating a predetermined program in the normal operation state and switching over to the sleep mode when the updating is completed.

Moreover, according to the exemplary embodiment of the present disclosure, the method may further include storing the updated program and applying the updated program to the equipment from the time of subsequent starting when the program updating is completed.

According to the present disclosure, standby power is minimally applied to a controller of a construction equipment and other controllers in a key-off to store operation information before a key-off, and as a result, equipment operation information such as information including channel information of an audio, information regarding a wind speed and a wind direction of an air conditioner used in starting the equipment cannot be stored and thus, information used just before when starting is on afterwards can be used as it is.

Further, since the standby power is minimally supplied even in a key-off, predetermined information of a construction apparatus can be accessed by using a control station or a user terminal.

In addition, firmware upgrading to the construction equipment can be performed even in a a key-off and firmware upgrading can be normally performed continuously even in the a key-off state while performing firmware upgrading in a a key-on state.

DETAILED DESCRIPTION

Figure 1:
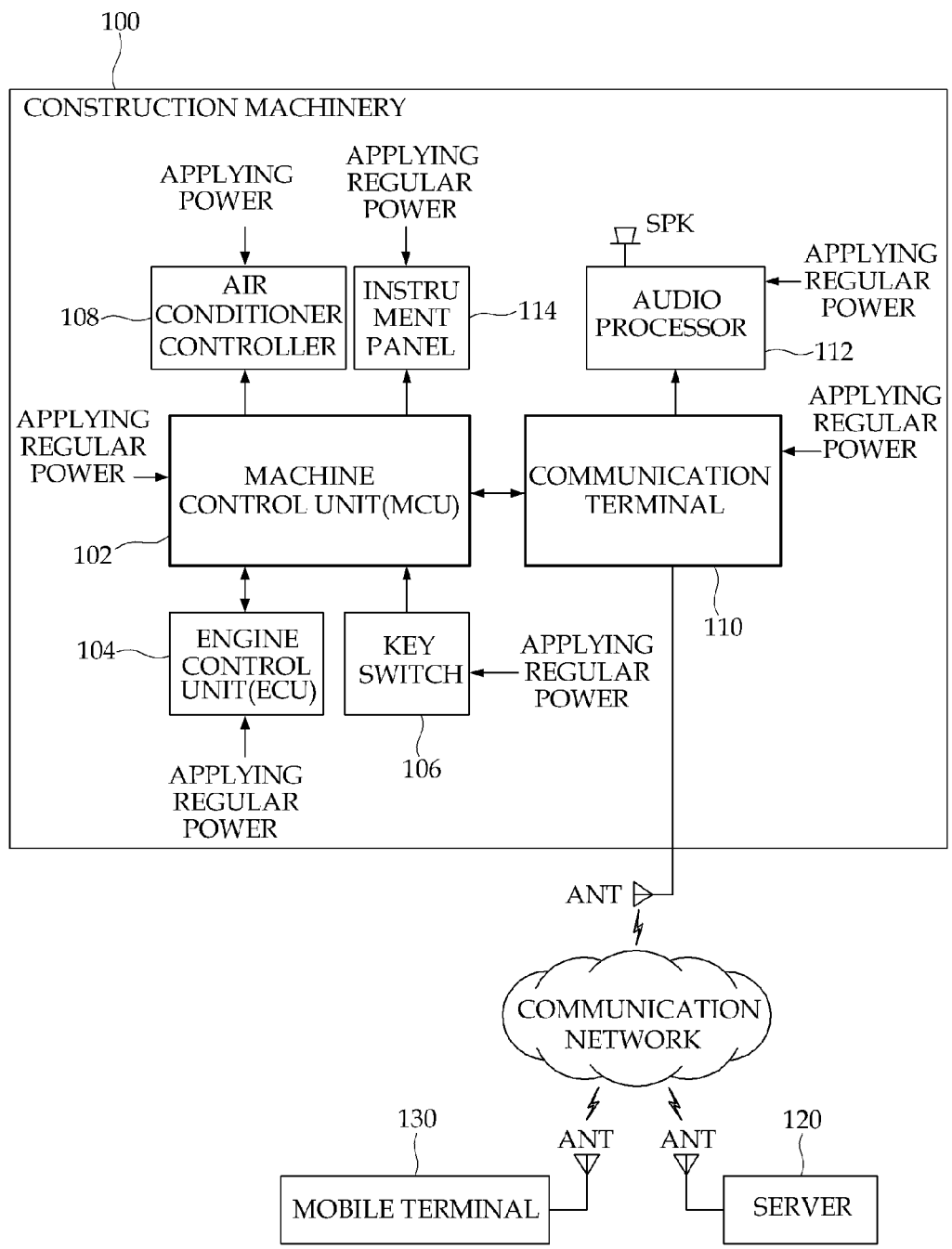
FIG. 1 is a configuration diagram of a remote control system according to an exemplary embodiment of the present disclosure.

Hereinafter, exemplary embodiments of the present disclosure will be described in detail with reference to the accompanying drawings. It should be noted that the same components refer to the same reference numerals anywhere as possible in the drawings. In the following description, specific detailed matters will be described and are provided to the more overall understanding of the present disclosure. Further, in describing the present disclosure, well-known functions or constructions will not be described in detail since they may unnecessarily obscure the understanding of the present disclosure.

Hereinafter, a method for controlling transmission and reception of data of a construction equipment which is with a starting key in an off state according to an exemplary embodiment of the present disclosure will be described in detail with reference to the accompanying drawings.

FIG. 1 is a configuration diagram of a remote control system of a construction equipment according to an exemplary embodiment of the present disclosure.

A system of remote management of a construction equipment according to the present disclosure includes a communication terminal 110, a equipment control unit 102, and various electronic control devices. The electronic control devices include electronic equipment used essentially to drive a equipment and electronic equipment for promoting driver's convenience. The electronic devices further include an engine controller unit 104, a key switch 106, an air conditioner controller 108, an instrument panel 114, an audio processor 112, and the like. Further, a battery (not shown) for supplying power to all the electronic control devices is included.

According to the present disclosure, all the electronic control devices can always supply standby power from the battery regardless of an on or ff state of a starting key. By this configuration, all the electronic control devices can operate in a normal operation mode by receiving battery power or engine generation power which is normal power with a key in an on state and operates in a sleep mode by receiving the battery power, however, receiving minimum power with the key in an off state. At this time, the sleep mode is a mode to enter a standby state with minimum power. Each of the electronic control devices switches over to a normal operation mode only when a wakeup signal is applied depending on occurrence of a predetermined event by receiving minimum power from the battery in the sleep mode to perform a necessary operation and thereafter, switches over to the sleep mode again.

All the electronic control devices maintains the sleep mode by receiving the standby power even with the key in the off state to perform data providing and program updating required by waking up only a corresponding electronic control device at the time of requesting predetermined data and requesting program updating in the construction equipment through a predetermined server such as a control station or a user's terminal.

Referring to FIG. 1, the communication terminal 110 is the terminal that is mounted on the construction equipment 100 for remote management of the construction equipment and performs communication through at least one of satellite communication and mobile communication. The communication terminal 110 is connected with the equipment control unit 102, performs communication through a server 120 and a communication network 120, and serves to transmit and receive data between the server 120 and the equipment control unit 102. In particular, in the present disclosure, when the communication terminal 110 receives a switching command to the sleep mode from the equipment control unit 102, the communication terminal 110 switches an operation state of the equipment control unit 102 to the sleep mode and when the communication terminal 110 receives the request for the predetermined data or program updating in the sleep mode state, the communication terminal 110 applies a wakeup signal to the equipment control unit 102 of the sleep mode state to wake up the equipment control unit 102.

The equipment control unit 102 controls an overall operation of the construction equipment 100 and includes an internal memory (not shown) storing necessary programs. When the equipment control unit 102 receives a key switch off signal from the key switch 106, the equipment control unit 102 transfers the sleep mode switching command to the communication terminal 110 and the electronic control devices and switches the operation mode from the normal operation mode to the sleep mode. At this time, the electronic control devices are called all electronic control devices connected with the equipment control unit 102 in the construction equipment 100.

Further, the communication terminal 110 wakes up from the sleep mode state at the time of receiving an operation request from the server 120 and thereafter, wakes up the equipment control unit 102 and transfers the requested operation of the server 120.

Therefore, the equipment control unit 102 performs the operation singly when performing the operation singly and thereafter, the equipment control unit 102 switches over to the sleep mode when completing the operation and when the operation is associated with at least one of the electronic control devices, the equipment control unit 102 performs the operation by waking up the corresponding electronic control device and switches the waked up electronic control device to the sleep mode when completing the operation.

As such, when the equipment control unit 102 receives the request for the predetermined data and the request for program updating from the communication terminal 110 in the sleep mode, the equipment control unit 102 wakes up and thereafter, performs the operation with the request. A detailed operation will be described with reference to FIGS. 2 to 6 below.

Although the configuration for transmitting and receiving data according to the request for the data and the request for program updating from the server 120 to the construction equipment has been described in the exemplary embodiment of FIG. 1, the configuration is not limited to the server 120 and a user can access the data of the construction equipment by using his/her own mobile terminal 130 in person.

Hereinafter, with reference to FIGS. 2 to 4, there will be described the flow of a signal for controlling transmission and reception of data between the server 120 and the construction equipment 100 in order for the server 120 to access the data of the construction equipment 100 when the construction equipment 100 is with the starting key in the off state in the remote control system configured as shown in FIG. 1.

Figure 2:
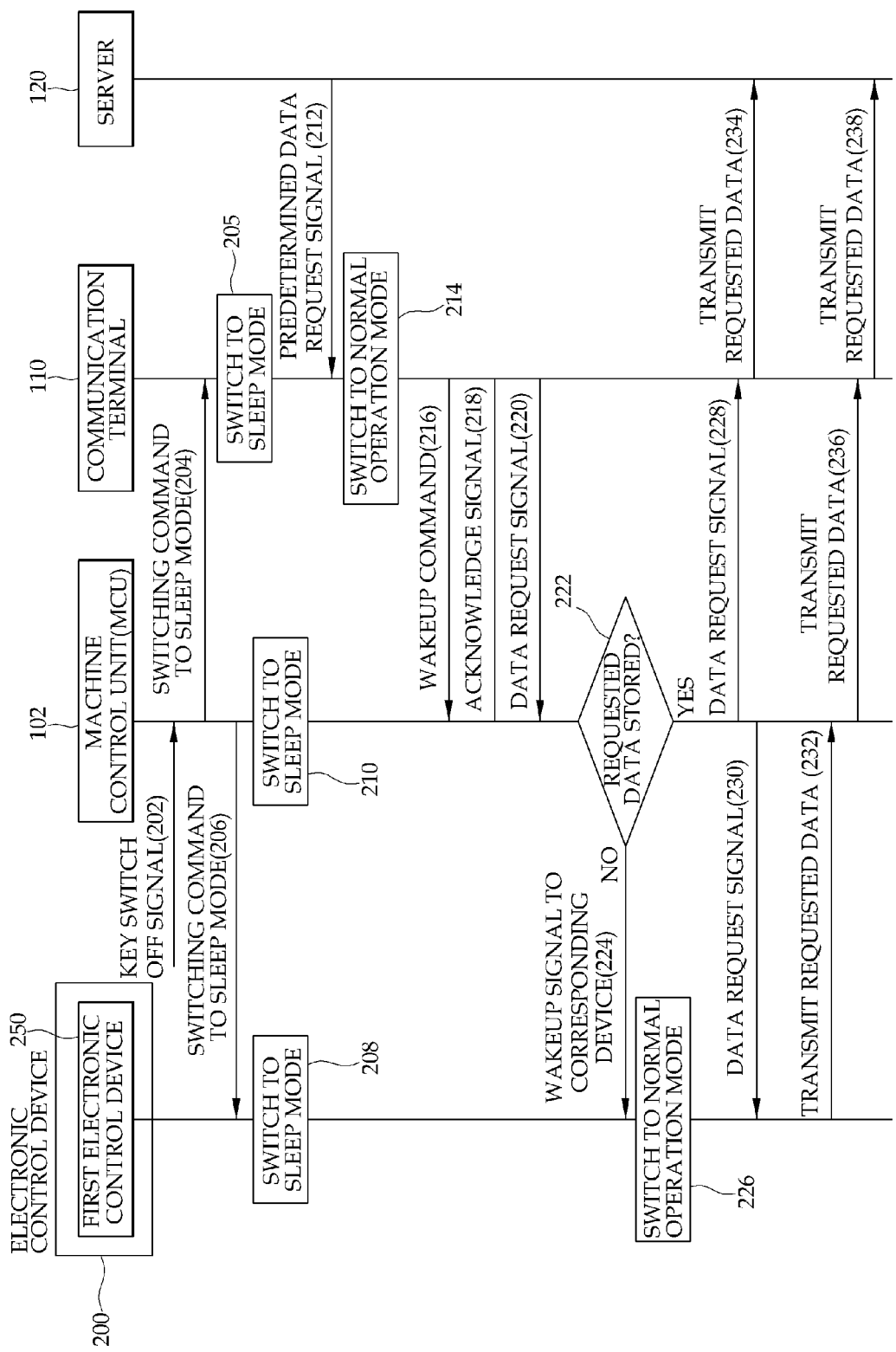
FIG. 2 is a signal flowchart showing a process of controlling transmission and reception of data at the time when a server requests predetermined data to a construction equipment when the construction equipment is in a key off state according to an exemplary embodiment of the present disclosure.

FIG. 2 shows a flowchart of a signal to control transmission and reception of data when a predetermined data request is made while the construction equipment 100 is in the sleep mode according to an exemplary embodiment of the present disclosure.

Hereinafter, in FIGS. 2 to 4, an electronic control device 200 is used as a term including all the electronic control devices connected with the equipment control unit 102 in the construction equipment 100. Assuming that a first electronic control device 250 is the electronic control device that should perform an operation with a predetermined request event among all the electronic control devices, the first electronic control device 250 will be described.

Referring to FIG. 2, when the equipment control unit 102 receives the key switch off signal from the key switch 106 in step S202, the equipment control unit 102 transfers the switching command to the sleep mode to the electronic control devices 200 connected with the communication terminal 110 in steps S204 and S206 and switches its current state to the sleep mode. Therefore, the electronic control devices 200 and the communication terminal 110 switch their current operation modes to the sleep mode in steps S208 and S205.

Thereafter, when the server 120 receives a request for a predetermined equipment from the user, the server 120 transmits a data request signal to the communication terminal 110 through the communication network 140 in step S212. At this time, the data request signal includes a flag representing what is requested data. Further, the data request signal may include even destination address information for representing data stored in which electronic control device of the construction equipment 100.

Therefore, when the communication terminal 110 operating in the sleep mode receives the data request signal, the communication terminal 110 wakes up to be in the normal operation state in step S214 and transfers to a wakeup command to the equipment control unit 102 in order to wake up the equipment control unit 102 in step S216.

The equipment control unit 102 wakes up according to the wakeup command and thereafter, notifies that the equipment control unit 102 wakes up by transmitting an acknowledge ack signal in step S218.

When The communication terminal 110 recognizes that the equipment control unit 102 wakes up by receiving the acknowledge signal, the communication terminal 110 transfers the received data request signal to the equipment control unit 102 in step S220.

When the equipment control unit 102 receives the data request signal, the equipment control unit 102 judges whether the data requested according to the data request signal is stored in step S222. Although a process when a flag for the requested data is included in the data request signal is shown in the exemplary embodiment of the present disclosure, if the destination address information is included in the data request signal transmitted from the server 120, the equipment control unit 102 will verify whether a destination address is the address of the equipment control unit 102 or the address of another electronic control device instead of inspecting whether the requested data is stored in the equipment control unit 102 in step S222.

Referring back to FIG. 2, the equipment control unit 102 reads the requested data when the requested data is stored therein according to the inspection result in step S222 and transmits the read data to the communication terminal 110 in step S228. Therefore, the communication terminal 110 transmits data received in step S234 to the server 120.

Meanwhile, when the requested data is not stored in the equipment control unit 102 according to the inspection result in step S222, it is verified which electronic control device among the electronic control devices 200 stores the corresponding data. At this time, since the equipment control unit 102 stores information regarding data stored in all the electronic control devices 200, the equipment control unit 102 verifies which the data corresponding to the flag included in the data request signal is stored in by using the information.

Thereafter, the equipment control unit 102 transmits the wakeup signal to the first electronic control device 250 in step S224 when the verified electronic control device is the first electronic control device 250.

Therefore, since the corresponding electronic control device 250 receives the wakeup command in the sleep mode, the corresponding electronic control device 250 wakes up and thereafter, is in the normal operation state in step S226.

The equipment control unit 102 transfers the data request signal received in step S230 when the first electronic control device 250 wakes up.

The first electronic control device 250 receiving the data request signal reads the requested data and transmits the requested data to the server 120 through steps S232 and S238.

Meanwhile, the first electronic control device 250, the equipment control unit 102, and the communication terminal 110 individually perform the necessary operations and thereafter, switch over to the sleep mode again to minimize power consumption.

Therefore, hereinafter, a process of controlling transmission and reception of data when the server 120 requests program updating to the construction equipment 100 while the construction equipment 110 is with the starting key in the off state according to an exemplary embodiment of the present disclosure will be described with reference to FIG. 3.

Figure 3:
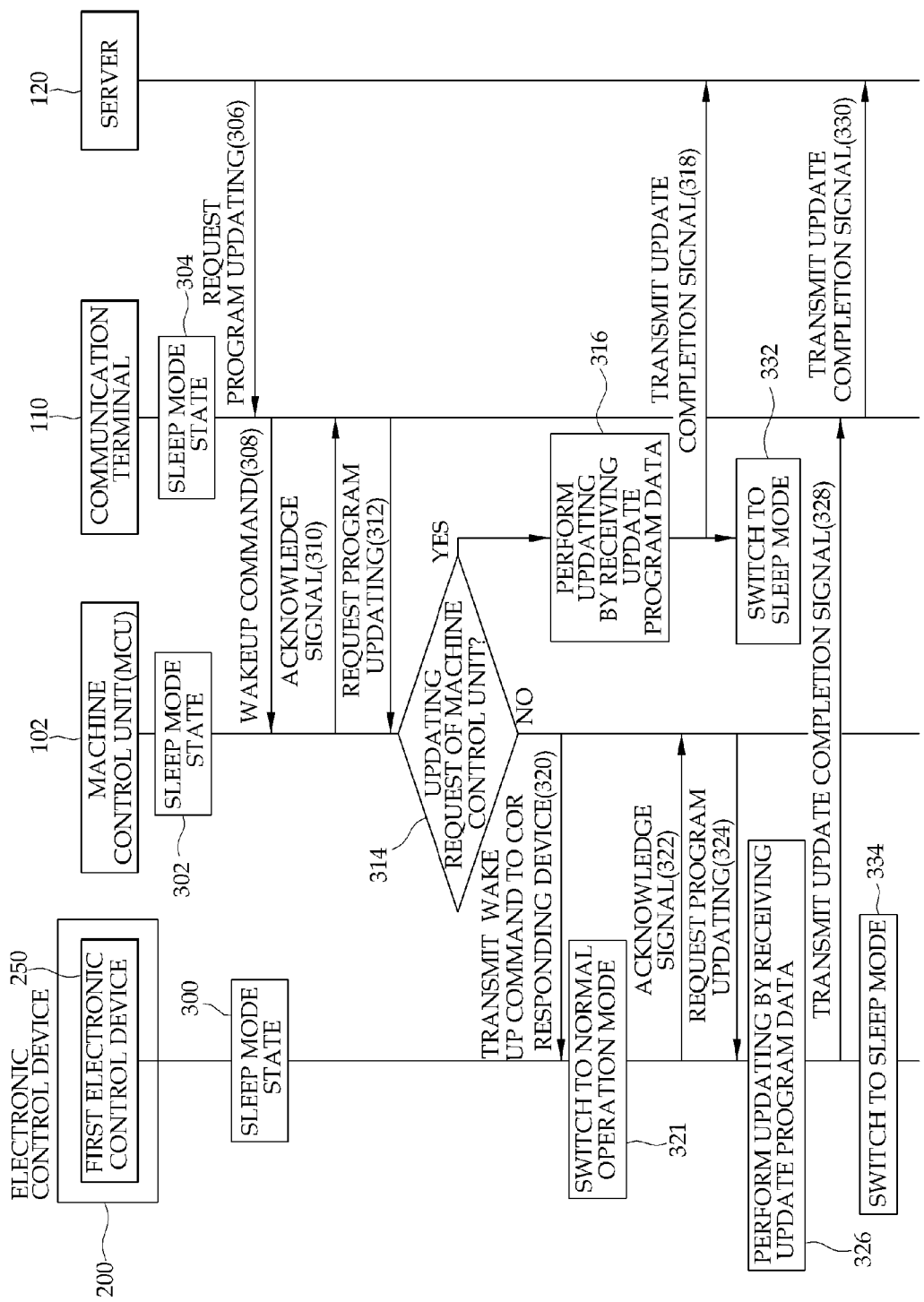
FIG. 3 is a signal flowchart showing a process of controlling transmission and reception of data at the time when a server requests program updating to a construction equipment when the construction equipment is in a a key-off state according to an exemplary embodiment of the present disclosure.

Referring to FIG. 3, since the construction equipment 100 is with the key in the off state, it is assumed that the operation modes of the electronic control devices 200, the equipment control unit 102, and the communication terminal 110 are the sleep mode in steps S300, S302, and S304.

In step S306, when an operator requests program updating to a predetermined equipment, the server 120 requests program updating to the communication terminal 110 of the corresponding equipment.

Therefore, the communication terminal 110 in the sleep mode state wakes up according to the request for program updating and thereafter, in step S308, the communication terminal 110 transmits the wakeup command to the equipment control unit 102.

When the equipment control unit 102 receives the wakeup command, the equipment control unit 102 wakes up in the sleep mode and thereafter, transmits the acknowledge signal for notifying that the equipment control unit 102 wakes up in step S310 to the communication terminal 110. Thereafter, the communication terminal 110 recognizes that the equipment control unit 102 wakes up and transfers the program updating request received from the server 120 to the equipment control unit 102.

Therefore, when the equipment control unit 102 receives the program updating request, the equipment control unit 102 verifies whether the corresponding program updating request is the program updating request in the equipment control unit 102 in step S314.

According to the verification result in step S314, when the corresponding program updating request is the program updating request of the equipment control unit 102, the equipment control unit 102 performs program updating by receiving update program data in step S316 and thereafter, transmits an update completion signal to the server 120 through the communication terminal 110 in step S318. Thereafter, the communication terminal 110 switches over to the sleep mode a predetermined time after updating is completed.

The server 120 recognizes that program updating to the corresponding construction equipment is successfully completed when receiving the update completion signal.

Meanwhile, according to the verification result in step S314, when the corresponding program is not the equipment control unit 102's own program but a program for another electronic control device, the equipment control unit 102 verifies the corresponding electronic control device. Herein, assuming that the verified electronic control device is the first electronic control device 250, the equipment control unit 102 transmits the wakeup command to the first electronic control device 250 in step S320.

When the first electronic control device 250 receives the wakeup command, the first electronic control device 250 wakes up and switches over to the normal operation mode in step S321 and transfers the acknowledge signal to the equipment control unit 102 and notifies that the first electronic control device 250 wakes up in step S322.

Thereafter, the equipment control unit 102 that recognizes that the first electronic control device 250 wakes up transfers the received program updating request to the first electronic control device 250.

In this case, the first electronic control device 250 performs program updating by receiving the update program data in step S326 and transmits the update completion signal to the server 120 through the communication terminal 110 in steps S328 and S330. Thereafter, in step S334, the first electronic control device 250 completes program updating and switches over to the sleep mode after a predetermined time elapsed.

From now on, a signal flow showing a process of controlling transmission and reception of data when the construction equipment 100 is with the starting key in the off state while performing program updating in the state in which the construction equipment 100 is with the starting key in the on state will be described with reference to FIG. 4.

In step S400, it is assumed that the electronic control device 200, the equipment control unit 102, and the communication terminal 110 are in the normal operation mode state.

When the server 120 receives the request for program updating to a predetermined equipment from the operator, the server 120 requests program updating to the communication terminal 110 of the corresponding equipment in step S402.

Therefore, the communication terminal 110 transfers the update request to the equipment control unit 102 in step S404 according to the program updating request.

The equipment control unit 102 which is in the normal operation state verifies whether the corresponding program updating request is the program updating request in the equipment control unit 102 in step S406 and when the corresponding program updating request is the program updating request of the equipment control unit 102, the process proceeds to step S408 and when the corresponding program updating request is not the program updating request in the equipment control unit 102 but the program for another electronic control device, the equipment control unit 102 verifies the corresponding electronic control device. Herein, assuming that the verified electronic control device is the first electronic control device 250, the equipment control unit 102 transmits the program updating request to the first electronic control device 250 in step S422.

Then, the first electronic control device 250 receives update program data to perform updating in step S422 and when the updating is completed, the first electronic control device 250 transmits the update completion signal to the server 120 through the equipment control unit 102 and the communication terminal 110 in steps S426 to S428. Thereafter, the operation mode of the first electronic control device 250 is switched to the sleep mode.

Meanwhile, according to the inspection result in step S406, when the corresponding program updating request is verified as the program updating request in the equipment control unit 102, the process proceeds to step S408 and the equipment control unit 102 receives the update program data and performs program updating.

However, when the key switch off signal is applied to the equipment control unit 102 in step S410 while the updating is performed, the operation mode is not immediately switched to the sleep mode and the process proceeds to step S414 to continuously perform the program updating operation. Thereafter, it is inspected whether the updating is completed in step S416 and when the updating is completed, the update completion signal is transmitted to the server 120 through the communication terminal 110 in step S420 and the operation mode is switched to the sleep mode. However, when the updating is not completed in step S416, the process proceeds to step S414 to continuously perform the program updating operation.

That is, when the operator stops starting while the equipment control unit 102 that receives the standby power is subjected to program updating during driving the equipment, the program updating is terminated and after a predetermined times elapsed, the operation mode is switched to the sleep mode.

Figure 4:
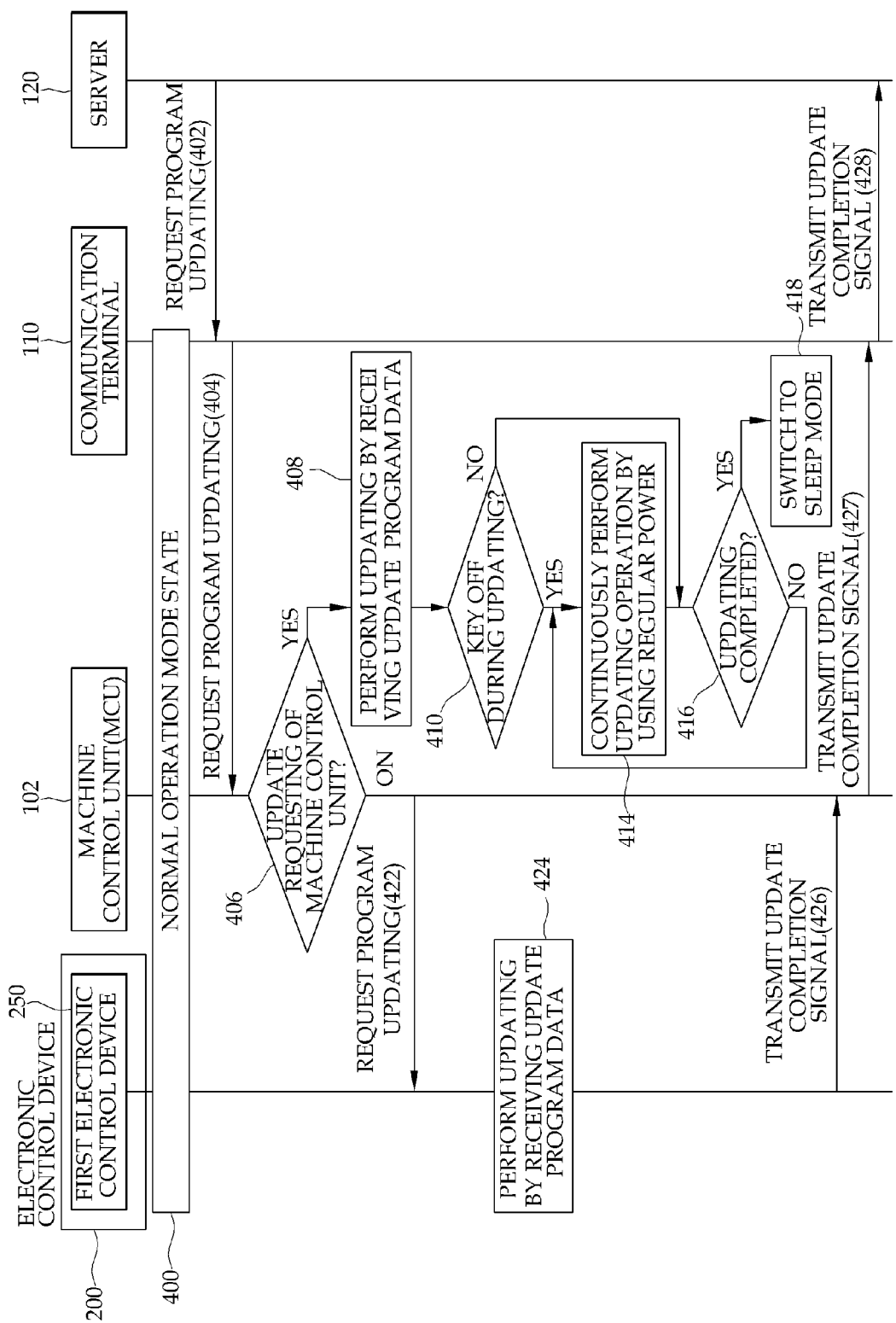
FIG. 4 is a signal flowchart showing a process of controlling transmission and reception of data at the time when a construction equipment is in key off while performing program updating in the state where the construction equipment is in a a key-on state according to an exemplary embodiment of the present disclosure.

Although the exemplary embodiment for the case in which starting stops during program updating of the equipment control unit 102 has been described in the exemplary embodiment of FIG. 4, program updating is terminated and thereafter, the operation mode is switched to the sleep mode in the same method even when starting stops during program updating of other electronic control devices.

Further, as shown in FIGS. 3 and 4, the equipment control unit 102 and the electronic control devices 200 that perform program updating applies the updated program from next starting and store the update program in memories and thereafter, applies the update program from next starting even though receiving the update program in driving the equipment.

As described above, although certain exemplary embodiments of the present disclosure has bee described in detail, it is to be understood by those skilled in the art that the spirit and scope of the present disclosure are not limited to the certain exemplary embodiments, but are intended to cover various modifications and changes without departing from the gist.

Accordingly, since the above-mentioned exemplary embodiments are provided to inform those skilled in the art of the scope of the present disclosure, it should be understood that they are exemplary in all aspects and not limited and the present disclosure is just defined by the scope of the appended claims.

The present disclosure can be applied to a system of remotely manage a construction equipment.

The invention claimed is:

1. A system of remote management of a construction equipment, comprising:
    a server communicatable with a communication terminal through a communication network; and
    a construction equipment where the communication terminal, an equipment control unit, and a plurality of electronic control devices are installed,
    wherein the communication terminal, the equipment control unit, and the electronic control devices are supplied electric power from a battery provided in the construction equipment,
    wherein the system is configured such that when the equipment control unit receives a key-off signal, the equipment control unit transfers a sleep mode switching command to the communication terminal and the electronic control devices of which operation states are switched to a sleep mode state,
    wherein the system is configured such that when the communication terminal wakes up from the sleep mode state at a time of receiving an operation request from the server in the form of a request for transmission of data possessed by the equipment control unit, the communication terminal thereafter transfers a wake-up command to the equipment control unit, waits for a wake-up acknowledgement signal from the equipment control unit, and thereafter transfers the previously received operation request of the server in the form of the request for transmission of data, and
    wherein the system is further configured such that when the operation requested by the server is the program updating of the equipment control unit or the electronic control devices,
    the equipment control unit keeps suppling power to the electronic control device in which program updating is in progress until the program updating is completed and switches the corresponding electronic control device to the sleep mode though the operation state is switched from a normal state to the sleep mode state by receiving a key-off signal during updating a predetermined program, and wherein the rest of the electronic control devices store operation information just before a key-off afterwards are immediately switched to the sleep mode state, when a starting key off signal is applied during updating a predetermined program in a normal operation state,
    the equipment control unit performs the operation without waking up the plurality of electronic control devices when performing the operation singly and thereafter, switches over to the sleep mode state when completing the operation, and when the operation is associated with at least one of the electronic control devices, the equipment control unit performs the operation by waking up the corresponding at least one electronic control device and switches the woken at least one electronic control device to the sleep mode when completing the operation;
    wherein the system is configured such that when the operation required by the server is a request for transmission of data possessed by the equipment control unit or the electronic control devices, the equipment control unit wakes up a corresponding electronic control device to collect the data and switches the corresponding electronic control device to the sleep mode state again when the requested data is data possessed by the corresponding electronic control device, and outputs the collected data to the server through the communication terminal and thereafter, also switches over to the sleep mode, wherein said request for transmission of data includes a flag representing what is requested data, and wherein the request for transmission of data includes destination address information, if the destination address information is included in the data request signal transmitted from the server, the equipment control unit verifies whether the destination address is the address of the equipment control unit or the address of another electronic control device instead of inspecting whether the requested data is stored in the equipment control unit.

2. The system of remote management of a construction equipment according to claim 1, wherein the system is configured such that when the operation requested by the server is program updating of the equipment control unit or the electronic control devices, the communication terminal wakes up the equipment control unit and receives data required for updating from the server,
    the equipment control unit verifies whether the data transmitted from the server is program updating in the equipment control unit and thereafter, when the data is its own program updating request, updates the corresponding program and when the data is not the program updating request in the equipment control unit, verifies an electronic control device in which program will be updated and thereafter, gives a wake-up command to the verified electronic control device and when the electronic control device wakes up, transfers the program updating request signal, and
    the verified electronic control device is woken by the equipment control unit and thereafter, performs the program updating.

3. The system of remote management of a construction equipment according to claim 2, wherein when the program updating is completed, the updated program is stored and thereafter, is applied to the equipment from the time of subsequent starting.

* * * * *